United States Patent
Kim

[11] Patent Number: 6,052,229
[45] Date of Patent: Apr. 18, 2000

[54] IMAGE DISPLAY SYSTEM USING A THIN-FILM ACTUATED MIRROR ARRAY

[75] Inventor: You-Kwang Kim, Seoul, Rep. of Korea

[73] Assignee: Daewoo Electronics Co., Ltd., Seoul, Rep. of Korea

[21] Appl. No.: 09/222,701

[22] Filed: Dec. 29, 1998

[51] Int. Cl.[7] .................................................. G02B 27/10
[52] U.S. Cl. ..................... 359/618; 359/634; 359/291; 353/31; 353/33; 353/37; 353/98; 345/98
[58] Field of Search ..................... 359/618, 634, 359/637, 290, 291, 871; 353/31, 33, 34, 37, 8, 98; 345/98

[56] References Cited

U.S. PATENT DOCUMENTS

| | | | |
|---|---|---|---|
| 4,943,154 | 7/1990 | Miyatake et al. | 353/31 |
| 5,486,881 | 1/1996 | Hwang | 353/34 |
| 5,560,697 | 10/1996 | Lim et al. | 353/37 |
| 5,669,687 | 9/1997 | Yang | 353/98 |
| 5,760,947 | 6/1998 | Kim et al. | 359/291 |
| 5,793,348 | 8/1998 | Lee et al. | 345/98 |

*Primary Examiner*—Loha Ben
*Attorney, Agent, or Firm*—Pennie & Edmonds LLP

[57] ABSTRACT

In an image display system capable of displaying an M×N number of pixels based on optical projection, a light source emits a white light, the white light being reflected on a total mirror at a predetermined angle. An optical filter splits the white light reflected from the total mirror into a trinity of primary light beams, i.e., a red, green and blue light beam. Each of a trinity of arrays of M×N actuated mirrors generates an optical pixel signal by reflecting the primary light beams impinging thereon, each of the actuated mirrors in the arrays being capable of changing the optical path of the primary light beams reflected therefrom, wherein a driver circuit controls each actuated mirror based on an input image signal. A projection stopper partially transmits the optical pixel signal and a projection screen displays the optical pixel signals passing through the projection stopper.

84 Claims, 11 Drawing Sheets

IMAGE DISPLAY SYSTEM USING A THIN-FILM ACTUATED MIRROR ARRAY

FIELD OF THE INVENTION

The present invention relates to an image display system; and, more particularly, to an image display system by using essentially thin-film actuated mirrors for generating an image from a television signal propagated through the air or cable.

BACKGROUND OF THE INVENTION

Among various video display systems available in the art, an optical projection system is known to be capable of providing a high quality display in a large scale. In such an image display system, light from a lamp is uniformly illuminated onto an array of actuated mirrors such that each of the mirrors is coupled with a corresponding one of the actuators. The actuators may be made of an electrodisplacive material such as a piezoelectric or an electrostrictive material which deforms in response to an electric field applied thereto.

The reflected light beam from each of the actuated mirrors is incident upon an aperture of a baffle. By applying an electrical signal to each of the actuators, the relative position of each of the mirrors to the incident light beam is altered, thereby causing a deviation in the optical path of the reflected beam from each of the actuated mirrors. As the optical path of each of the reflected beams is altered, the amount of light reflected from each of the mirrors which passes through the aperture is changed, thereby displaying an image.

Apparatus for optically modulating primary beams of light to make a color image has been known in the art. For example, U.S. Pat. No. 5,150,205, filed on Nov. 1, 1989 by Gregory Um and Andrei Szilagyi, issued on Sep. 22, 1992 and entitled "ACTUATED MIRROR OPTICAL INTENSITY MODULATION", discloses an optical intensity modulator by using the actuated mirrors. The modulator comprises a white light source having a collimation lens; a beam splitter for splitting the white light into three primary lights; a beam spreader for spreading the primary light beams; a non-reflective surface having apertures therein; a scanner for providing a horizontal sweep of the light beams onto a projection screen; a collimation lens; and a projection lens. The patent issued to Gregory Um et al. has certain deficiencies, however. For instance, there are problems associated with an inaccurate horizontal sweep caused by using the mechanically rotating scanner and an inaccurate control of reflection at the beam spreader resulting from using hinged actuated mirrors therein.

Various efforts for remedying the above problems have been made. The mechanical scanner disclosed in the U.S. Pat. No. 5,150,205 has been eliminated (see U.S. Pat. No. 5,560,697 issued on Oct. 1, 1997, and entitled "OPTICAL PROJECTION SYSTEM"). The beam splitter has been replaced with an M×N pixel filter (see U.S. Pat. No. 5,612,814 issued on Mar. 18, 1997 and entitled "COMPACT SIZED OPTICAL PROJECTION SYSTEM"). The hinge in the actuated mirror of the beam spreader has been eliminated and improved to have various alternatives(see U.S. Pat. No. 5,661,611 issued on Aug. 26, 1997 and entitled "THIN FILM ACTUATED MIRROR ARRAY AND METHOD FOR THE MANUFACTURE THEREOF"). The actuated mirror in the beam spreader has been further improved to have a mirror arranged on top of an actuated structure in order to overcome the inaccurate control of reflection at the beam spreader (see U.S. Pat. No. 5,760,947 issued on Jun. 2, 1998 and entitled "THIN FILM ACTUATED MIRROR ARRAY FOR USE IN AN OPTICAL PROJECTION SYSTEM AND METHOD FOR THE MANUFACTURE THEREOF"). Furthermore, a new driver circuit has been introduced to efficiently drive the actuated mirrors (see U.S. Pat. No. 5,793,348 issued on Aug. 11, 1998 and entitled "ACTUATED MIRROR ARRAY DRIVING CIRCUIT HAVING A DAC").

Each of the above-mentioned improvements, however, has been made rather independently and is limited to certain parts of the entire image display system. Further, an unavoidable heat accumulation in the system incurred by the light source may cause a malfunction or even failure of the system. Accordingly, there has continued to exist a need for a more feasible and reliable image display system.

SUMMARY OF THE INVENTION

It is, therefore, a primary object of the present invention to provide a reliable and efficient image display system.

In accordance with the present invention, there is provided an image display system capable of displaying an M×N number of pixels, wherein M and N are integers, respectively, comprising: a light source for emitting a white light; a total mirror for reflecting the white light at a predetermined angle; an optical filter for splitting the white light reflected from the total mirror into a trinity of primary light beams; a trinity of arrays of M×N actuated mirrors, including a first, a second and a third array of M×N actuated mirrors, each of the M×N actuated mirrors for generating optical pixel signals by reflecting the primary light beams impinging thereon, each of the actuated mirrors in the arrays being capable of changing the optical path of the primary light beams reflected therefrom; a projection stopper for partially transmitting the optical pixel signals; a driver circuit for controlling each actuated mirror based on an input image signal; and a projection screen for displaying the optical pixel signals passing through the projection stopper.

BRIEF DESCRIPTION OF THE DRAWINGS

The above and other objects and features of the present invention will become apparent from the following description of preferred embodiments given with reference to the accompanying drawings, in which.

DETAILED DESCRIPTION OF THE PREFERRED EMBODIMENTS

Figure 1:
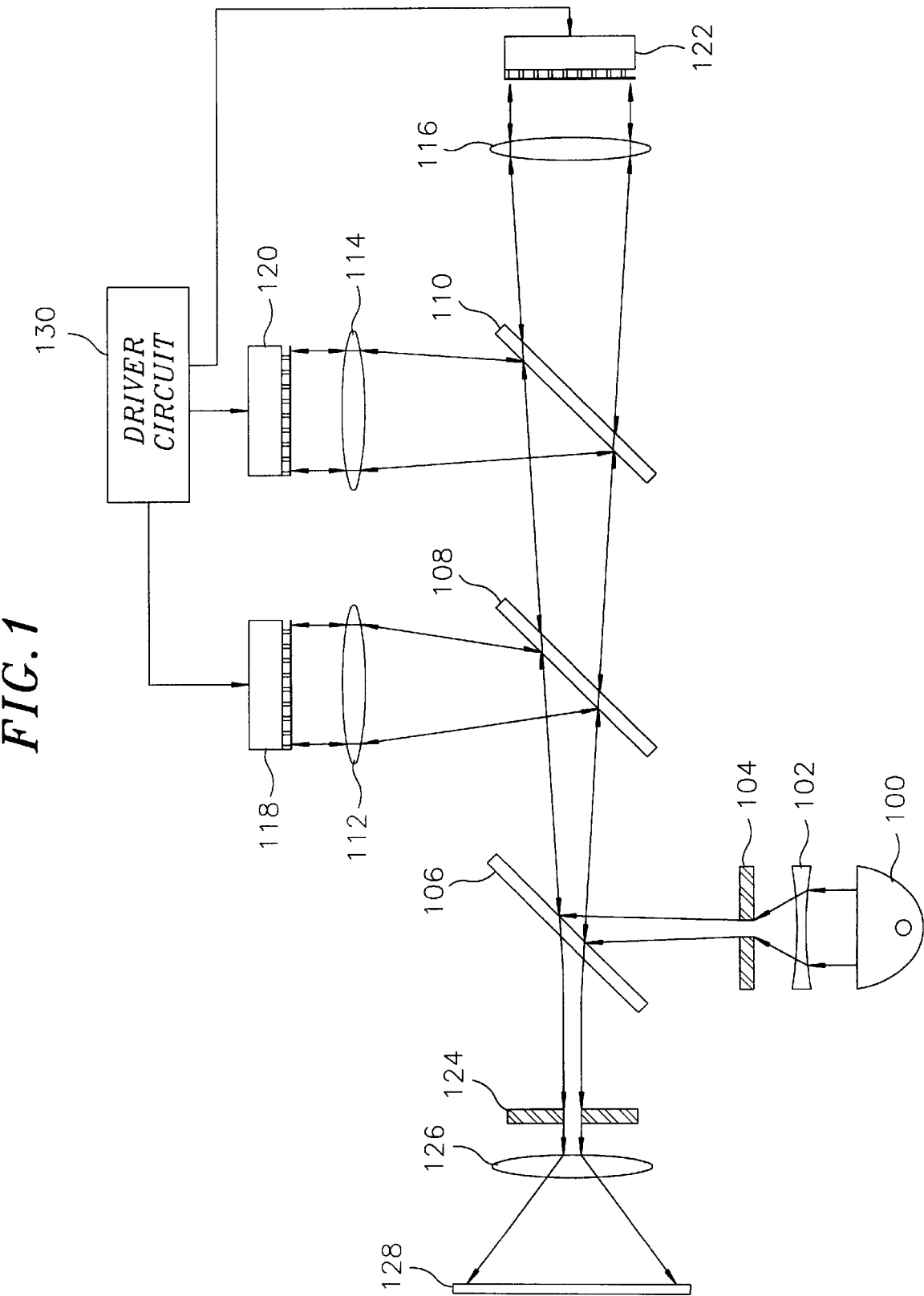
FIG. 1 illustrates a schematic view of an image display system in accordance with a preferred embodiment of the present invention.

In FIG. 1, there is illustrated a schematic view of an image display system in accordance with an embodiment of the present invention comprising a light source 100, a source lens 102, a source stopper 104 provided with a light transmitting portion having a predetermined configuration and a light stopping portion, a total reflection mirror 106 including a reflective surface, optical filters 108, 110, field lenses 112, 114, 116, a trinity of arrays of M×N actuated mirrors 118, 120, 122, M and N being positive integers, respectively, a projection stopper 124 provided with a light transmitting portion having the predetermined configuration and a light stopping portion, a projection lens 126, a projection screen 128 and a driver circuit 130.

In such a system, a white light emanating from the light source 100 is focussed along a first optical path onto the light transmitting portion on the source stopper 104 via the source lens 102 located between the light source 100 and the source stopper 104, wherein the white light includes a first, a second and a third primary light beam, each of the primary light beams being one of the primary colors, i.e., red, green and blue. The source stopper 104 is used for shaping the white light from the light source 100 via the source lens 102 into a predetermined configuration by allowing a specific portion of the white light to pass through the light transmitting portion thereof.

The white light from the source stopper 104 travels onto the reflective surfaces of the total reflection mirror 106. The reflective surface of the total reflection mirror 106 is in a facing relationship with the source stopper 104 and the field lenses 112, 114, 116.

The white light reflected from the reflected surface of the total reflection mirror 106 impinges upon each of the optical filters made of dichroic mirrors 108, 110, i.e., a red color filter 108 and a blue color filter 110. The red color filter 108 reflects only red color component beam and transmits the other color component beams. The blue color filter 110 reflects only blue color component beam and transmits the other color component beams.

Each of the component beams through the optical filters 108, 110 is uniformly illuminated onto the array of M×N actuated mirrors 118, 120, 122, respectively. Each of the actuated mirrors in the arrays 118, 120, 122 is capable of changing the optical path of each of the primary light beams reflected therefrom in response to an electric signal applied thereto. Each of the actuated mirrors in the arrays 118, 120, 122 corresponds to a pixel to be displaced on the projection screen 128. The reflected beams reflected from each of the reflective mirrors are focused at the projection stopper 124. Only a fraction of each beam impinged to the projection stopper 124 is transmitted through the projection stopper 124, the fraction ranging from 0% to 100% thereof. Beams through the projection stopper 124 pass through the projection lens 126 and are projected onto the projection screen 128. Further detailed structure, operation and modifications of the image display system of FIG. 1 is disclosed in U.S. Pat. No. 5,560,697 issued on Oct. 1, 1997, entitled "OPTICAL PROJECTION SYSTEM," which is herein incorporated by reference therefrom as if fully set forth at length herein.

Figure 2:
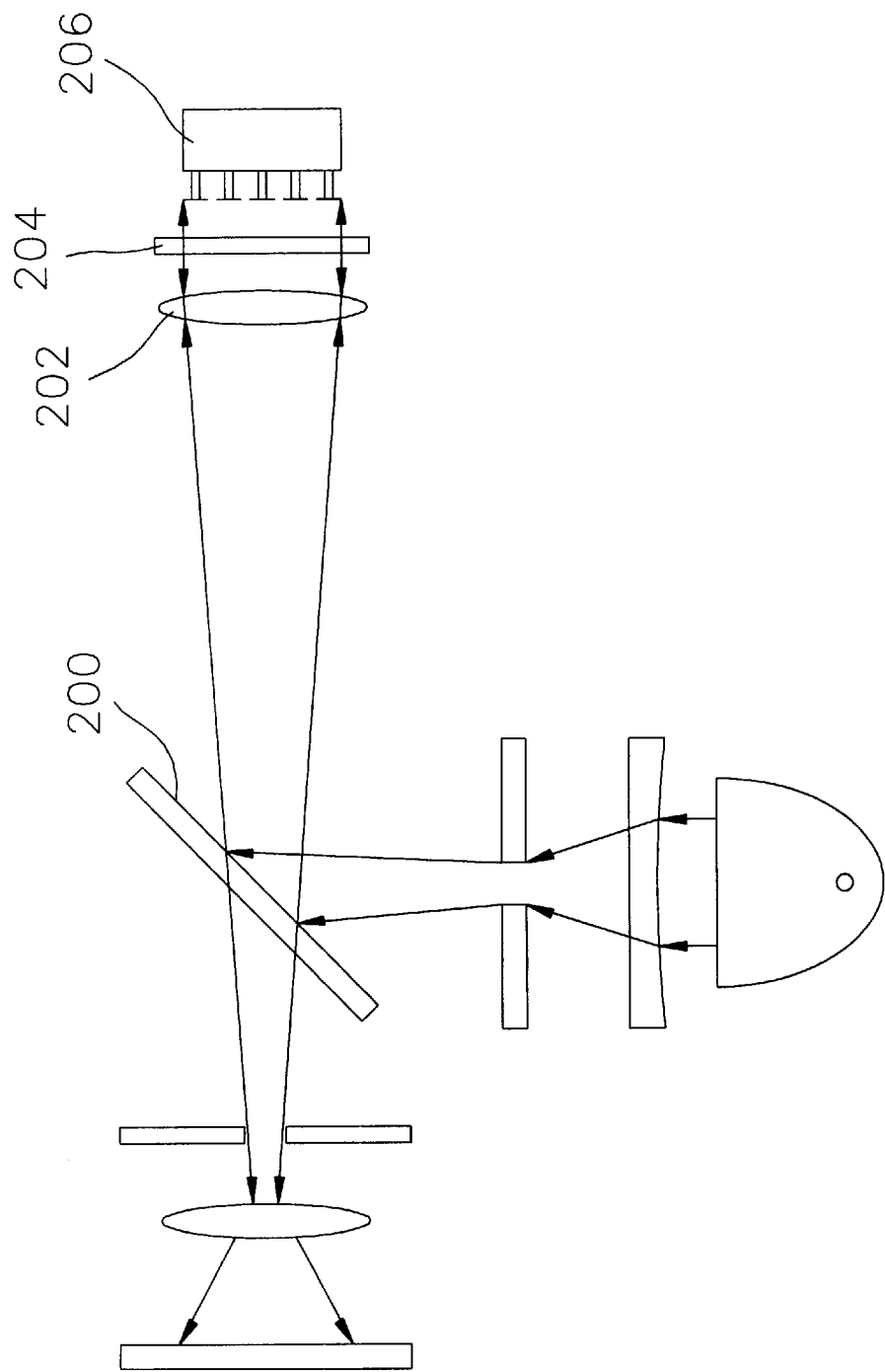
FIG. 2 describes a schematic view of an image display system in accordance with another preferred embodiment of the present invention.

Another embodiment of the present invention is described in FIG. 2. In the embodiment of FIG. 2, the optical filters 108, 110 of FIG. 1 are eliminated; there is provided one array of actuated mirror 206 instead of three arrays of actuated mirrors 118, 120, 122; there is also provided one field lens 202 instead of three field lenses 112, 114, 116; and an array of M×N pixel filter 204 is inserted between the field lens 202 and the array of actuated mirror 206. The other part of the image display system of FIG. 2 is substantially identical to the corresponding parts of FIG. 1, respectively.

In the embodiment shown in FIG. 2, the array of M×N pixel filter 204 includes a plurality of sets of R pixel filter, G pixel filter and B pixel filter, each of the sets being duplicated both along a horizontal direction and a vertical direction. Each of the R, G and B pixel filter is capable of transmitting only one of the primary light beams onto each of the actuated mirrors 206. Each of the R, G and B pixel filter includes a dichroic coat, made of a dielectric material, e.g., $MgF_2$.

Each of the actuated mirrors in the array 206 reflects one of the primary beams from the array of the pixel filter 204, thereby producing a packet of reflected primary beams travelling along an optical path, i.e., a third optical path, different from that of the primary light beams from the array of M×N pixel filter 204.

The embodiment shown in FIG. 2 is of a reduced size and is structurally simple, requiring a less number of components than the one shown in FIG. 1. This is achieved by incorporating therein an array of M×N pixel filter 204, thereby eliminating the pair of dichroic mirrors 108, 110, a pair of field lenses 112, 114 and a pair of arrays of actuated mirrors 118, 120 in the embodiment of FIG. 1. Further detailed structure, operation and modifications of the image display system of FIG. 2 is disclosed in U.S. Pat. No. 5,612,814 issued on Mar. 18, 1997, entitled "COMPACT SIZED OPTICAL PROJECTION SYSTEM," which is herein incorporated by reference therefrom as if fully set forth at length herein.

Figure 3:
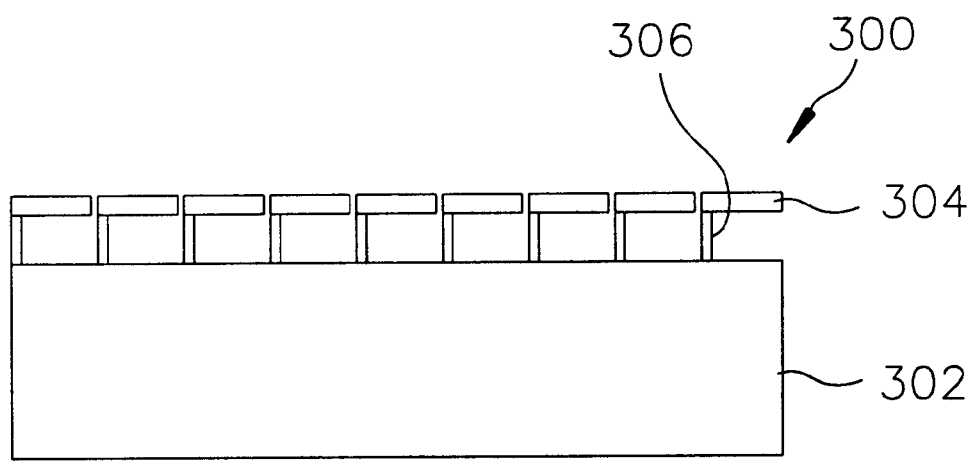
FIG. 3 shows a side view of an array of actuated mirrors arranged on a substrate.

Meanwhile, FIG. 3 shows a side view of the array of M×N actuated mirrors arranged on a substrate 302. The array of M×N actuated mirrors 300 includes a substrate 302, M×N number of actuated mirrors 304 and pedestals 306 uniformly arranged on the upper surface of the substrate 302.

FIGS. 4A to 4E illustrate a cross sectional view of various exemplary make-ups of an actuated mirror.

Figure 4A:
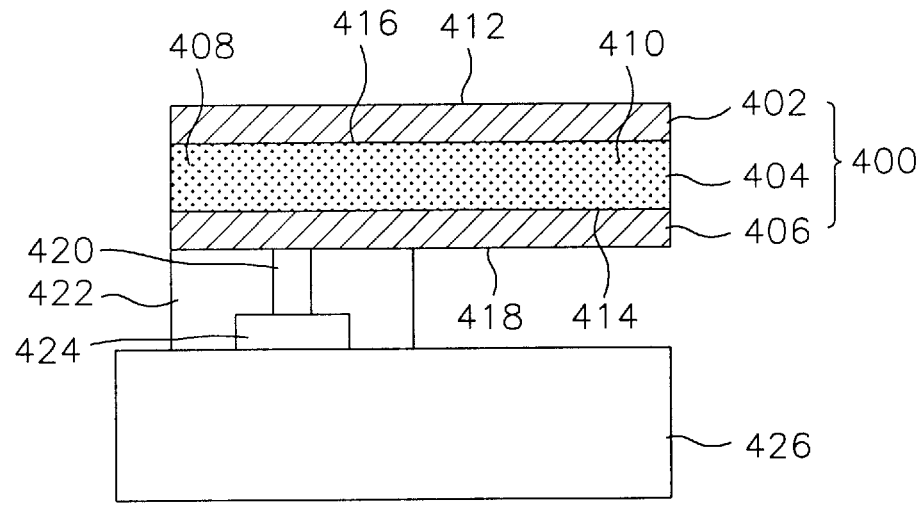
FIGS. 4A to 4E demonstrate a cross sectional view of various exemplary make-ups of an actuated mirror.

FIG. 4A represents a detailed cross sectional view of an active matrix including a segment of the substrate 426 and an actuated mirror 400, wherein each of the actuated mirrors 400 is provided with a top and a bottom surfaces 412, 418, respectively, a proximal and a distal ends 408 and 410, respectively, and further includes at least a thin film layer 404 of a motion inducing material 404, a first and a second electrodes 402 and 406, respectively, of a specific thickness, made of, e.g., a metal such as gold (Au) or silver (Ag), the first electrode 402 having a top surface 412 reflecting the primary lights. The first electrode 402 is placed on an inner top surface 416 of the motion-inducing thin film layer 404 and the second electrode 406 on an inner bottom surface 418 thereof. The motion-inducing thin film layer 404 is made of a piezoelectric ceramic, an electrostrictive ceramic, a magnetrostrictive ceramic or a piezoelectric polymer. In the case when the motion-inducing thin film layer 404 is made of a piezoelectric ceramic or a piezoelectric polymer, it must be poled.

Each of the M×N pedestals 422 is used for holding each of the actuated mirrors 400 in place and also for electrically connecting the second electrode 402 in each of the actuated mirrors 400 with the corresponding connecting terminal 424 on the substrate 426 by being provided with a conduit 420 made of an electrically conductive material, e.g., a metal.

An electrical field is applied across the motion-inducing thin film layer 404 between the first and the second electrodes 402, 406, in each of the actuated mirrors 400. The application of such an electric field will cause a deformation of the motion-inducing layer 404, hence the actuated mirror 400, and hence the top surface 412 thereof.

Figure 4B:
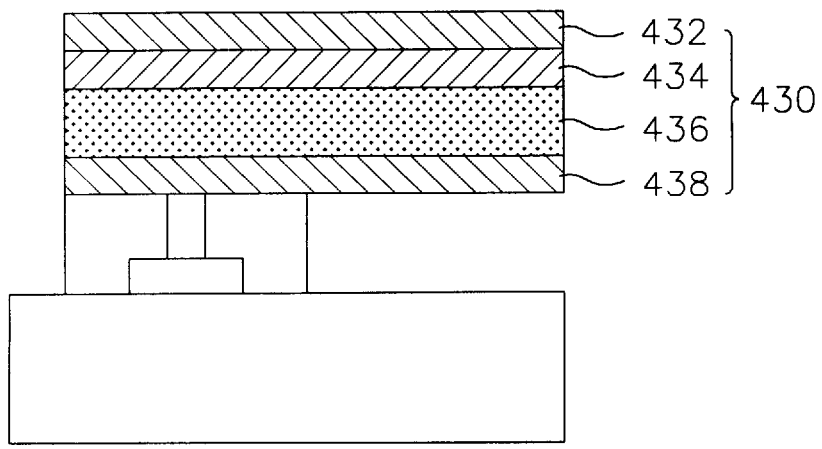
Figure 4C:
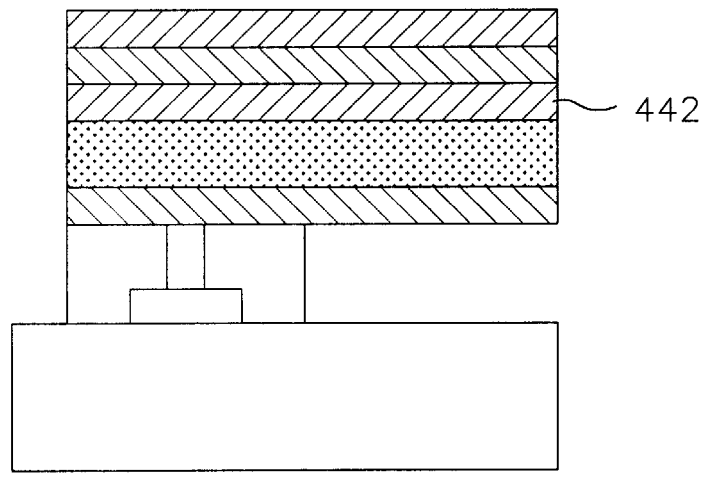
Figure 4D:
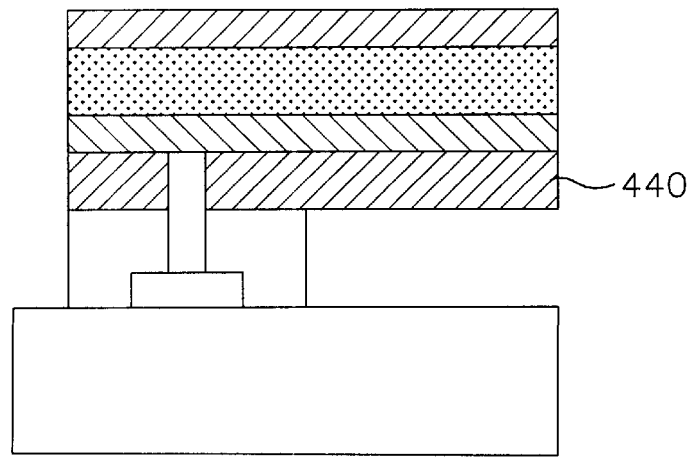

In order for the array of M×N thin film actuated mirrors to function properly, as shown in FIG. 4B, the combined thickness of a mirror 432 and the first electrode 434 in each of the thin film actuated mirrors 430 must be different from that of the second electrode 438 therein for the deformation of the thin film actuated mirror to take place. If not, an elastic layer 440 as shown in FIG. 4D or an elastic layer 442 as shown in FIG. 4C must be further provided to each of the actuated mirrors.

Further details of the array of actuated mirrors are described in U.S. U.S. Pat. No. 5,661,611 issued on Aug. 26, 1997, entitled "THIN FILM ACTUATED MIRROR ARRAY AND METHOD FOR THE MANUFACTURE THEREOF," which is herein incorporated by reference therefrom as if fully set forth at length herein.

Figure 4E:
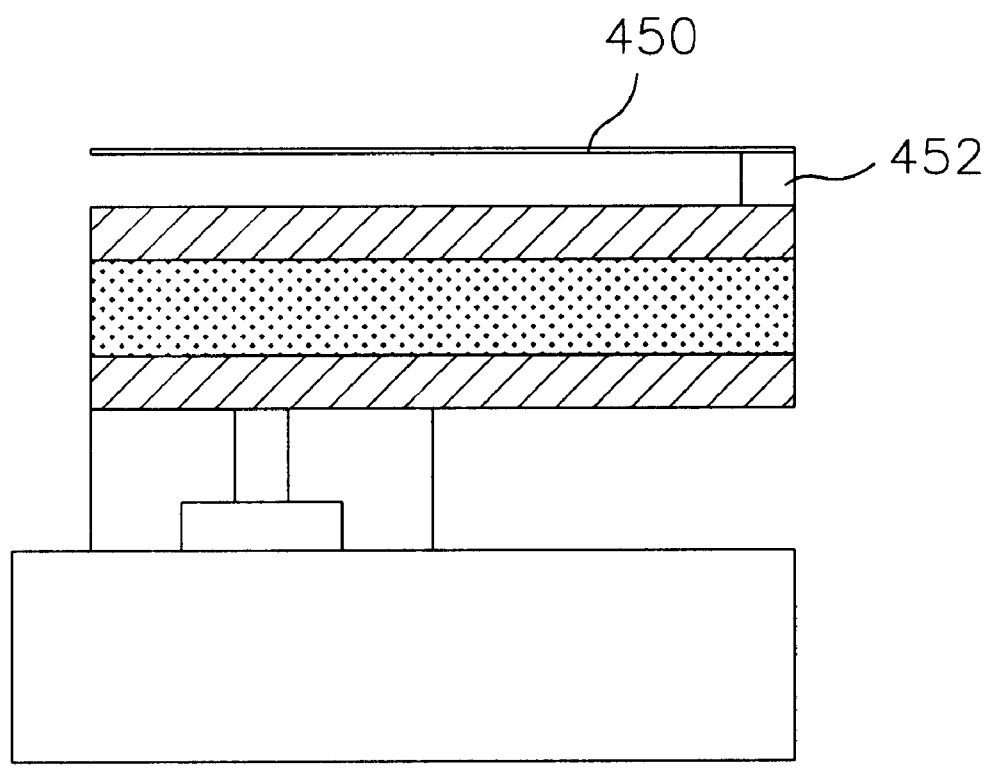

Referring to FIG. 4E, there is illustrated a mirror-topped thin film actuated mirrors with a mirror topped thereon. The mirror-topped thin film actuated mirrors further includes a mirror layer 450 for reflecting lights mounted on top surface 412 of the thin film actuated mirrors shown in FIGS. 4A to 4D and a supporting layer 452. The mirror layer 450 can be applied to any one of the thin film actuated mirrors shown in FIGS. 4A to 4D. The mirror layer 450 is capable of providing a linearity in bending and tilting of the actuated mirrors, which in turn gives accuracy in reflecting the primary lights.

Further details of the array of mirror-topped actuated mirrors are described in U.S. Pat. No. 5,760,947 issued on Jun. 2, 1998, entitled "THIN FILM ACTUATED MIRROR ARRAY FOR USE IN AN OPTICAL PROJECTION SYSTEM AND METHOD FOR THE MANUFACTURE THEREOF," which is herein incorporated by reference therefrom as if fully set forth at length herein.

Figure 5:
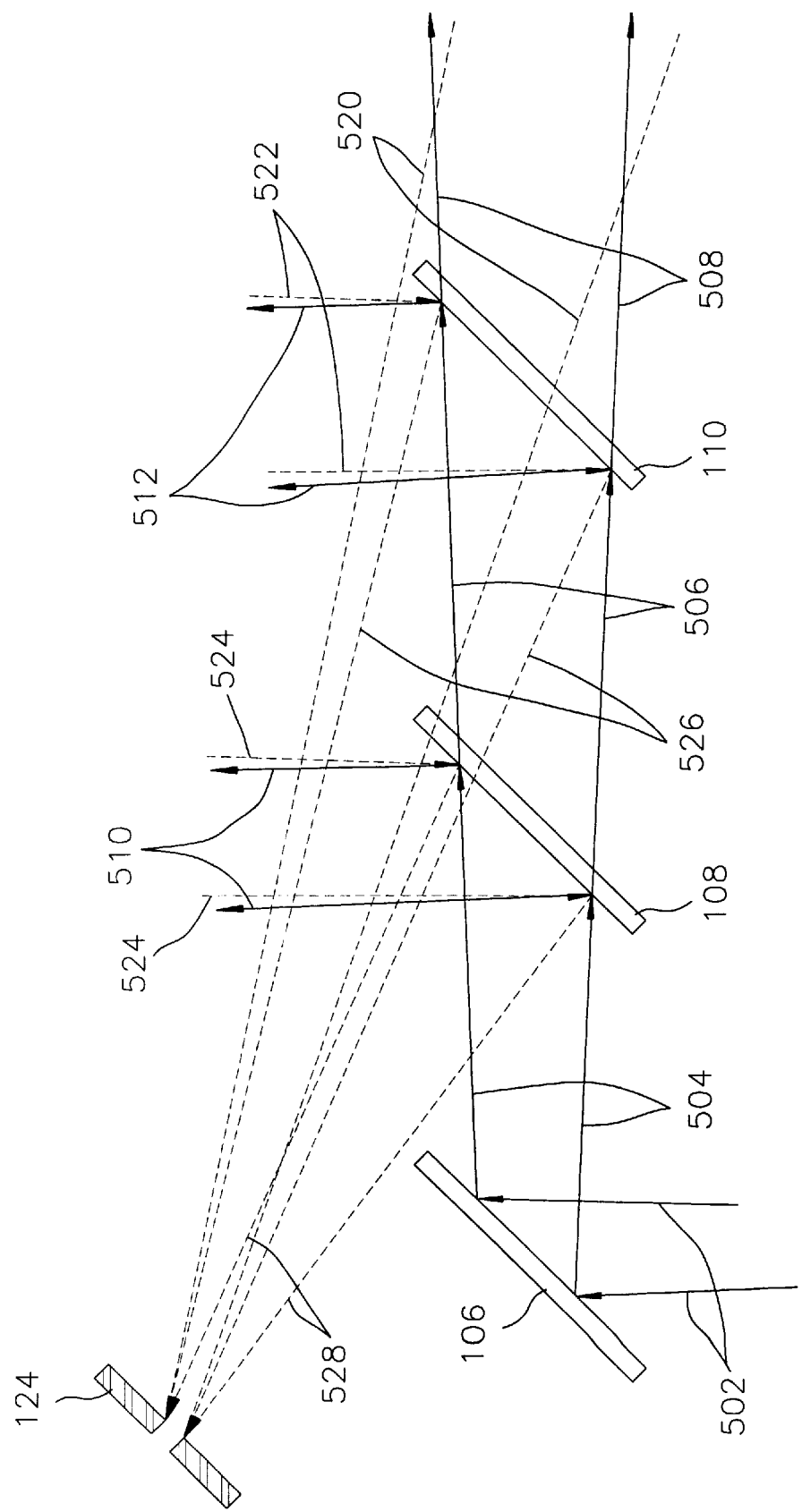
FIG. 5 presents exemplary tracks of light beams before impinging on a projection stopper.

With reference to FIG. 5, there is presented exemplary tracks of light beams before impinging on the projection stopper 124. Light beams shown with solid lines represent the light paths before impinging the arrays of the actuated mirrors and light beams represented with dotted lines are for the light paths after impinging the arrays of the actuated mirrors. Light beams 502 represent the lights generated from the light source 100; light beams 504 represent the lights reflected at the total mirror 106; light beams 506 represent the lights that have been transmitted through the red color filter 108, i.e., the light beams 506 being a light beam including green and blue color beams; light beams 508 represent the lights that have been transmitted through the blue color filter 110, i.e., the light beams 508 being a light beam including green color beams; and light beams 510 represent portions of the light beams 504 that have been reflected from the red color filter 108, i.e., the light beams 510 being a light beam including red color beams; and light beams 512 represent portions of light beams 506 reflected at the blue color filter 110, i.e., the blue color beam. The arrangement of the optical filters may be interchanged.

Light beams 520 represent light beams reflected at the array of actuated mirrors 122; light beams 522 represent light beams reflected at the array of actuated mirrors 120; light beams 524 represent light beams reflected at the array of actuated mirrors 118; light beams 526 represent parts of light beams 522 that have been reflected at the optical filter 110;

light beams 528 represent parts of light beams 524 that have been reflected at the optical filter 108.

The total mirror 106 is arranged in such a manner that the light beams 520, 526 and 528 may be focussed on the projection stopper 124. Further, to make the light beams 520, 526 and 528 be focussed on the projection stopper 124 without being obstructed, the total mirror 106 should be so arranged that it will not be on the way of the light paths of the light beams 520, 526 and 528.

Figure 6A:
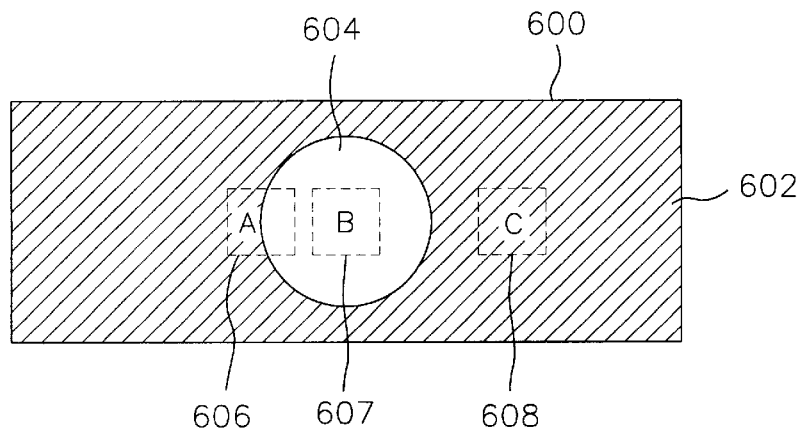
FIGS. 6A to 6C exhibit various shapes of the projection stopper and exemplary configurations of primary lights impinging thereon.
Figure 6B:
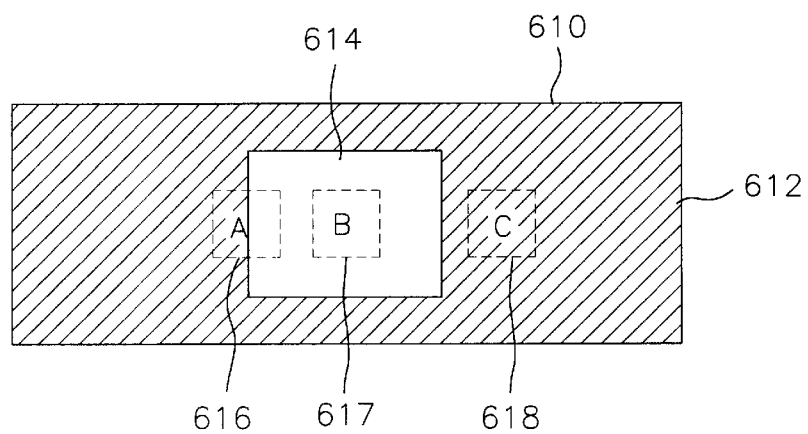
Figure 6C:
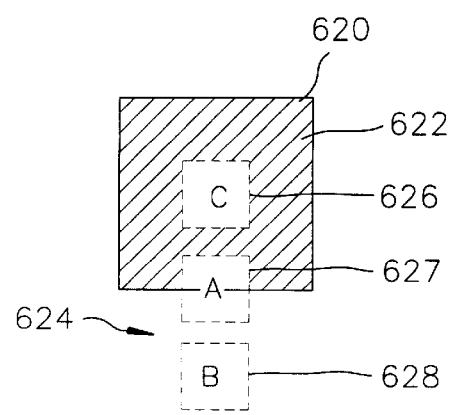

Referring to FIGS. 6A to 6C, there are plotted various shapes of the projection stopper 124 or 602, 612, 622 and exemplary configurations of the primary lights impinging thereon, i.e., a circle type 600, a rectangular type 610 and an edge type 620, respectively. In the figures, etched parts present the light blocking portion of the projection stopper 124 and non-etched parts present the light transmitting portion thereof. Each of the dotted-line rectangles 606, 607, 608, 616, 617, 618, 626, 627, 628 represents an illumination caused by one thin film actuated mirror of the arrays of actuated mirrors.

In FIG. 6A, the light transmitting portion 604 is the circle type. The light beams having been reflected at the arrays of actuated mirrors impinge the projection stopper 124. In case of "A", the illumination is partially blocked; in case of "B", the entire illumination passes through the projection stopper 124; and in case of "C", the illumination is entirely blocked by the projection stopper 124. Likewise, in each of FIGS. 6B and 6C, in case of "A", the illumination is partially blocked; in case of "B", the entire illumination passes through the projection stopper; and in case of "C", the illumination is entirely blocked by the projection stopper. In place of the projection stoppers 600, 610, 620 shown in FIGS. 6A to 6C, any stoppers which are capable of partially block the impinging light can be used. The quantity of the illumination passing through the projection stoppers 600, 610, 620 corresponds to the intensity of light at a pixel of the projection screen 128. By controlling the quantity of the illumination passing through the projection stoppers 600, 610, 620, the illumination intensity of the light at the pixel of the projection screen 128 is controlled.

Figure 7:
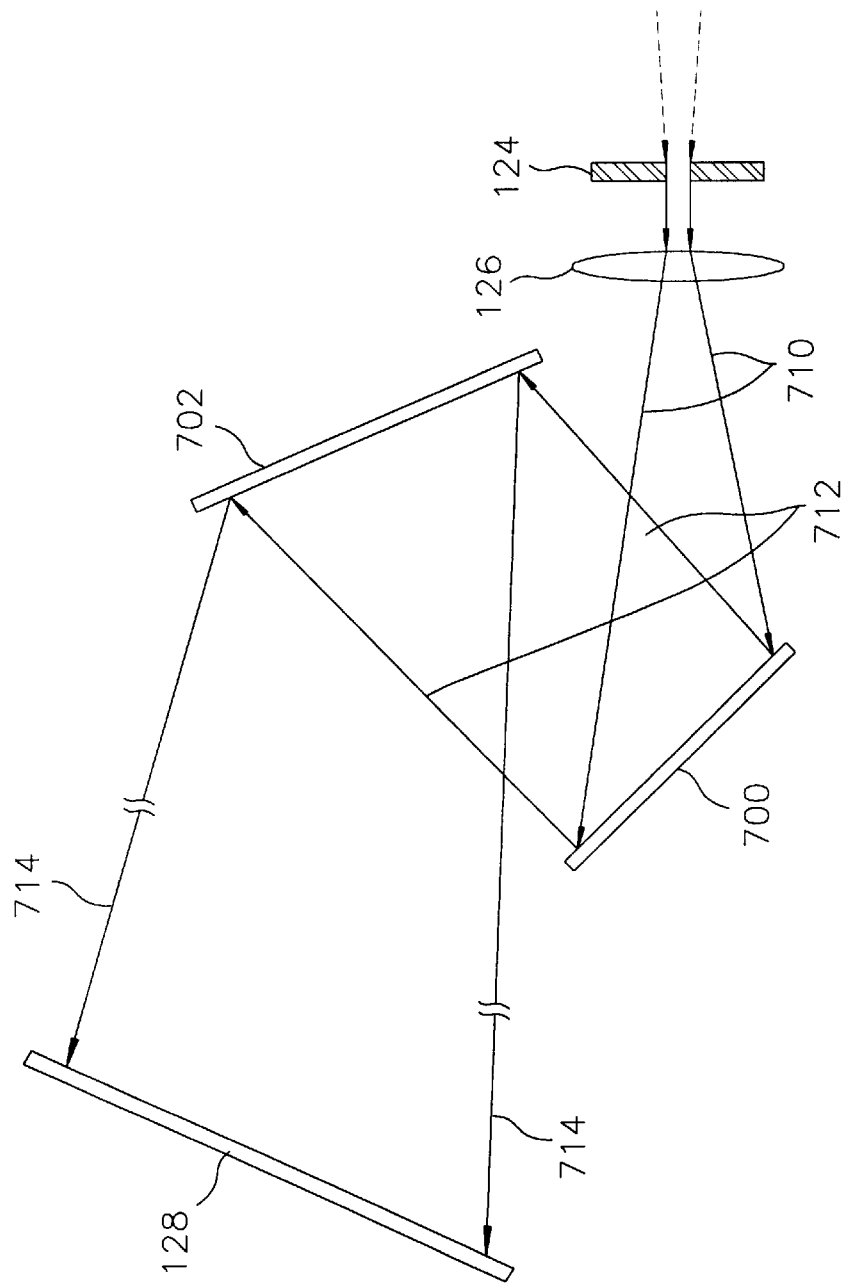
FIG. 7 represents exemplary tracks of light beams after impinging on the projection stopper.

FIG. 7 represents exemplary tracks of light beams after impinging into the projection stopper. The light beams reflected at each of the arrays of actuated mirrors are focussed near the light transmitting portion of the projection stopper 124. For the light beams to be casted on the projection screen 128 uniformly in a large scale, the light beams that have passed through the projection stopper 124 should be fanned out. First, the projection lens 126 fans out the light beams, and, then, properly arranged mirrors 700, 702 reflect the light beams after passing through the projection lens 126 to make the light beams accurately fit onto the projection screen 128. Light beams 710, 712, 714 are sequentially fanned out as they are reflected from the mirrors 700, 702. The number of the mirrors, e.g., 700, 702 is variable depending on the size of the projection screen 128 and the length of the paths of the light beams transmitted from the projection stopper 124.

Figure 8:
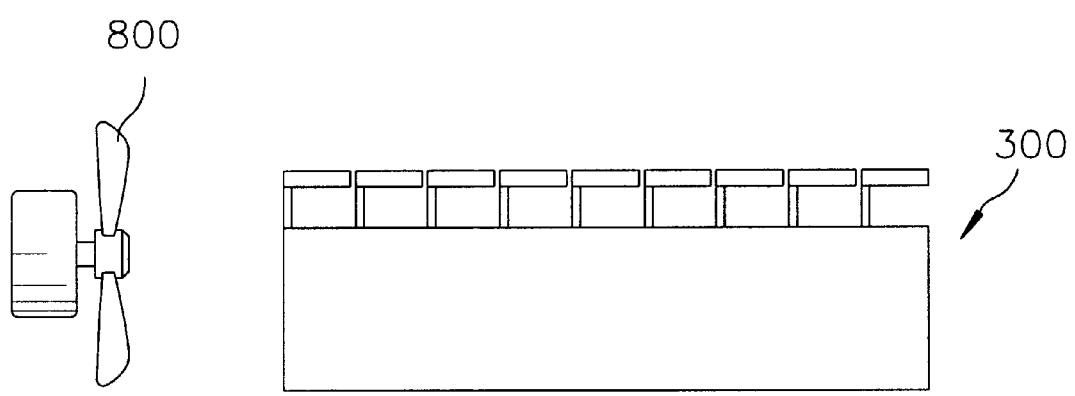
FIG. 8 depicts a cooler for use in dissipating heat caused by a light source.

Meanwhile, the light source 100 radiates not only optical energy but also thermal energy. The thermal energy heats up the image display system. In particular, the arrays of actuated mirrors are mostly heated up by the thermal energy. Temperature increase in the arrays of actuated mirrors may cause malfunction or failure. FIG. 8 depicts a cooler for use in dissipating heat generated in the system, wherein an electric fan 800 is used in cooling the arrays of actuated mirrors. Alternatively, for the purpose of cooling off the arrays of actuated mirrors, a heat-radiator which is normally used in cooling semiconductor devices may be used.

Figure 9:
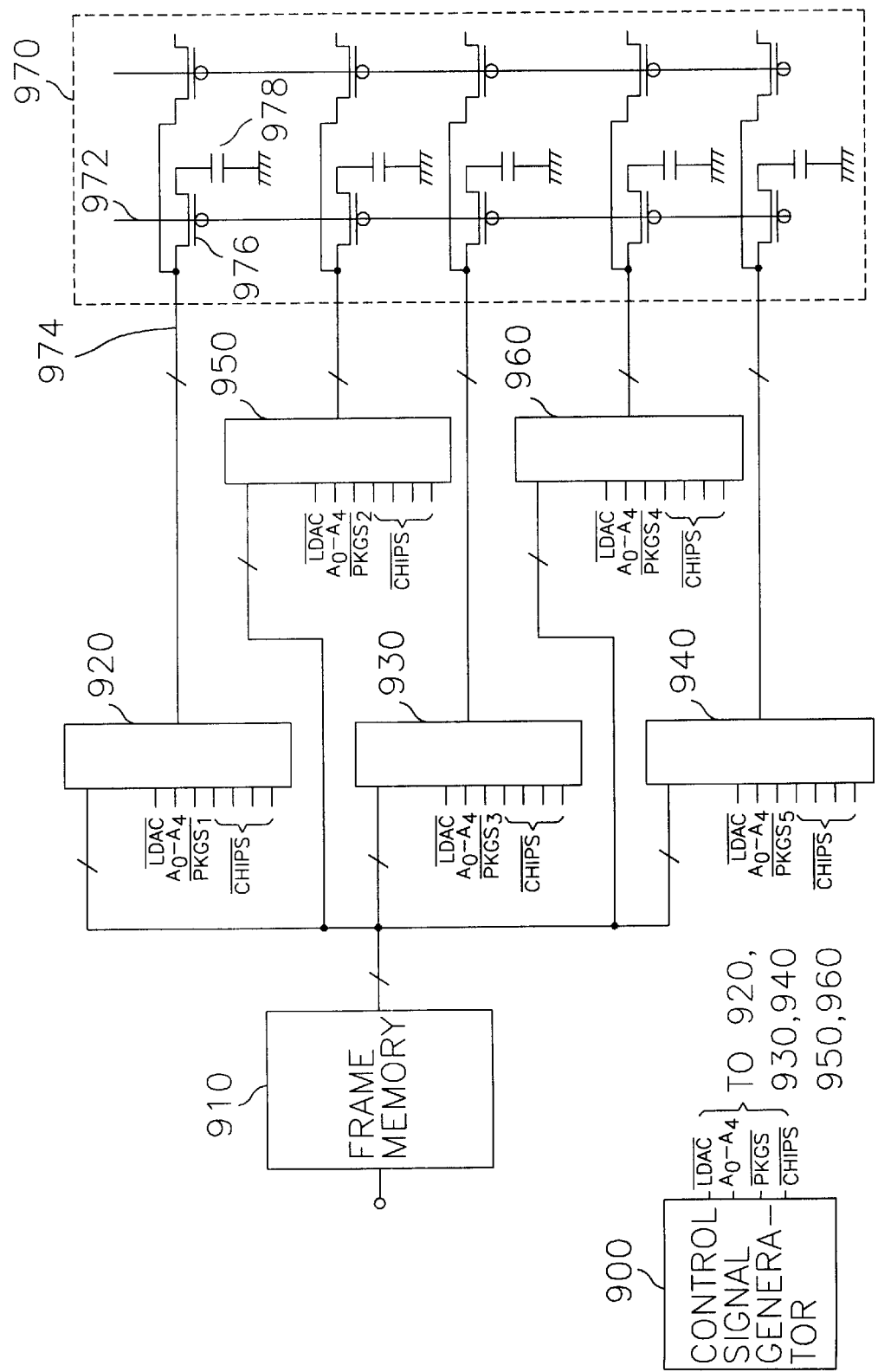
FIG. 9 provides a block diagram of a driver circuit in accordance with the present invention.

As for the driver circuit 130, FIG. 9 provides a block diagram of a driver circuit in accordance with the present invention for each of the arrays of actuated mirrors, wherein each element in the arrays of actuated mirrors includes a plurality of TFTs (Thin Film Transistors) 970 which are arranged as crossovers of data lines 974 and select lines 972. As each of the select lines 972 is sequentially selected, a data signal is applied as a voltage signal to a signal line 974 which is individually associated with a row of thin film actuated mirrors to thereby produce a horizontal video line of an image on the display.

The driver circuit provided in FIG. 9 further includes a frame memory 910 and five modular package ICs 920, 930, 940, 950, 960 having 128-channel of a substantially identical construction. A video signal in the form of a digitized data signal is fed to the frame memory 910 for the storage thereof through an input terminal. As well known in the art, the video signal comprises a plurality of horizontal line video signals being scanned in accordance with a scanning pulse. Each of the digital signals is divided into N number, i.e., 640, of digital signals, each of the divided digital signals having 8-bit data. The stored digital data signals are sequentially provided to the package ICs 920, 930, 940, 950, 960 from the frame memory 910.

Further details of the driver circuit are described U.S. Pat. No. 5,793,348 issued on Aug. 11, 1998, entitled "ACTUATED MIRROR ARRAY DRIVING CIRCUIT HAVING A DAC," which is herein incorporated by reference therefrom as if fully set forth at length herein.

The above-described image display system is more accurate than the system using the mechanical scanner since it employs the array of actuated mirrors which is a static pixel image generator. Further, the inventive image display system is capable of providing images of higher-definition since each of the actuated mirrors is more efficient in operation than the prior art counterpart of a clamped type. In addition, the inventive image display system is more reliable and feasible than the prior art counterpart since an avoidable heat accumulation can be reduced by the cooler.

While the present invention has been described with respect to the preferred embodiments, other modifications and variations may be made without departing from the scope and spirit of the present invention as set forth in the following claims.

What is claimed is:

1. An image display system capable of displaying an M×N number of pixels, wherein M and N are integers, respectively, comprising:

a light source for emitting a white light;

a total mirror for reflecting the white light at a predetermined angle;

an optical filter for splitting the white light reflected from the total mirror into a trinity of primary light beams;

a trinity of arrays of M×N actuated mirrors, including a first, a second and a third arrays of M×N actuated mirrors, each of the M×N actuated mirrors for generating optical pixel signals by reflecting the primary light beams impinging thereon, each of the actuated mirrors in the arrays being capable of changing the optical paths of the primary light beams reflected therefrom;

a projection stopper for partially transmitting the optical pixel signals;

a driver circuit for controlling each actuated mirror based on an input image signal; and a projection screen for displaying the optical pixel signals passing through the projection stopper.

2. The image display system of claim 1, further comprising a source stopper, provided with a light transmitting portion having a specific configuration and a light stopping portion and being placed between the optical means and the light source, for shaping the white light emitted from the light source into a predetermined configuration.

3. The image display system of claim 2, further comprising a source lens, disposed between the source stopper and the light source, for focussing the white light onto the source stopper.

4. The image display system of claim 3, wherein the optical filter includes two dichroic mirrors including a first and a second dichroic mirrors, the first dichroic mirror for reflecting a first primary light while transmitting the other primary lights upon receiving a light reflected from the total mirror, the second dichroic mirror for reflecting a second primary light while transmitting a third primary light upon receiving a light transmitted through the first dichroic mirror.

5. The image display system of claim 4, further comprising a trinity of field lenses including a first, a second and a third field lenses, each of the first, second and third field lenses being located between the first dichroic mirror and the first array of M×N actuated mirrors, between the second dichroic mirror and the second array of M×N actuated mirrors, and between the second dichroic mirror and the third array of M×N actuated mirrors, respectively, wherein each of the field lenses is used for collimating a primary light beam onto the corresponding array of M×N actuated mirrors and for refocusing the primary light beam reflected from the corresponding actuated mirrors in each of the arrays.

6. The image display system of claim 5, wherein the projection stopper is used for passing therethrough a predetermined amount of the primary light beams reflected from the trinity of arrays of M×N actuated mirrors.

7. The image display system of claim 6, wherein the predetermined amount of each of the reflected primary light beams is determined based on the amount of each of the reflected primary light beams passing through the light transmitting portion of the projection stopper.

8. The image display system of claim 7, further comprising a projection lens for projecting the primary light beams transmitted through the projection stopper onto the projection screen, thereby displaying each of the pixels corresponding thereto.

9. The image display system of claim 8, further comprising a cooler for reducing heat generated in the arrays of M×N actuated mirrors.

10. The image display system of claim 9, wherein the light transmitting portion of the source stopper is identical to the light transmitting portion of the projection stopper in the shape and size thereof.

11. The image display system of claim 10, wherein the source stopper and the projection stopper are positioned at the focal points of the field lenses employed therein, respectively.

12. The image display system of claim 11, wherein each of the arrays of M×N actuated mirrors includes:

an active matrix having a substrate and an array of M×N connecting terminals;

an array of M×N thin film actuating structures, each of the thin film actuating structures being provided with a top and a bottom surfaces, a proximal and a distal ends, each of the thin film actuating structures having at least a thin film layer of a motion-inducing material having a top and a bottom surfaces, and a first and a second electrodes of a specific thickness, the first electrode being placed on the inner top surface 416 of a motion-inducing thin film layer and the second electrode, on the inner bottom surface 414 thereof, wherein an electrical signal applied across the motion-inducing thin film layer between the first and the second electrodes causes a deformation of the motion-inducing thin film layer, and the thin film actuating structures;

an array of M×N supporting members, each of the supporting members being provided with a top and a bottom surfaces, wherein each of the supporting members is used for holding a corresponding actuating structure in place and also electrically connecting the corresponding actuating structure with the active matrix, wherein the corresponding actuating structure is cantilevered from said each of the supporting members, the bottom surface of the corresponding actuating structure being mounted on the top surface of said each of the supporting members at the proximal end; and an array of M×N mirrors for reflecting light beams, wherein each of the mirrors is placed on top of a corresponding actuating structure such that each of the mirrors deforms in response to the deformation of the corresponding actuating structure.

13. The image display system of claim 12, wherein the bottom surface of each of the supporting members is placed on top of the active matrix.

14. The image display system of claim 12, wherein the motion-inducing thin film layer is made of a piezoelectric ceramic or a piezoelectric polymer.

15. The image display system of claim 12, wherein the motion-inducing thin film layer is poled.

16. The image display system of claim 12, wherein the motion-inducing thin film layer is made of an electrostrictive material.

17. The image display system of claim 12, wherein the motion-inducing thin film layer is made of a magnetostrictive material.

18. The image display system of claim 12, wherein each of the supporting members is provided with a conduit for electrically connecting the second electrode in each of the actuating structures with a corresponding connecting terminal on the active matrix.

19. The image display system of claim 12, wherein each of the M×N mirrors is made of a light reflecting material.

20. The image display system of claim 12, wherein the first and the second electrodes cover completely the top and the bottom surfaces of the motion-inducing thin film layer, respectively.

21. The image display system of claim 12, wherein either the first or the second electrode covers partially the top or the bottom surface of the motion-inducing thin film layer.

22. The image display system of claim 12, wherein the first and the second electrodes are made of an electrically conducting material.

23. The image display system of claim 22, wherein the first electrode is made of a light reflecting material, to thereby allow the first electrode to function also as the mirror in a corresponding thin film actuating structure.

24. The image display system of claim 23, wherein the first electrode has the same thickness as the second electrode in each of the actuating structures.

25. The image display system of claim 24, further including M×N elastic layers, each of the elastic layers being placed on the bottom surface of the actuating structures.

26. The image display system of claim 23, wherein the first electrode has a different thickness from the second electrode in the corresponding actuating structure.

27. The image display system of claim 12, further comprising M×N elastic layers, each of the elastic layers being placed on the top surface of a corresponding actuating structure.

28. The image display system of claim 27, wherein said each of the elastic layers is disposed between the mirror and the first electrode in the corresponding actuating structure.

29. The image display system of claim 12, further comprising M×N elastic layers, each of the elastic layers being placed on the bottom surface of a corresponding actuating structure.

30. The image display system according to claim 11, wherein each of the arrays of M×N actuated mirrors includes:

a substrate having an array of M×N connecting terminals formed on top thereof;

an array of M×N actuating structures, each of the actuating structures being provided with a proximal and a distal ends, each of the actuating structures having at least one thin film layer of a motion-inducing material and a first and a second electrodes with the first electrode being placed on top of the motion inducing layer and the second electrode on bottom of the motion-inducing layer, wherein an electrical signal applied across the motion-inducing layer between the first and the second electrodes causes a deformation of the motion-inducing layer, and the actuated mirror;

an array of M×N supporting members, each of the supporting members being located between a corresponding actuating structure and a corresponding substrate, and being used for cantilevering the corresponding actuating structure;

an array of M×N spacer members, each of the spacer members being disposed on top of a corresponding actuating structure at the distal end thereof; and an array of M×N mirror layers, each of the mirror layers including a first and a second portions corresponding to the distal and the proximal ends of a corresponding actuating structure, the first portion of said each of the mirror layers being secured on top of a corresponding spacer member, such that when each of the actuating structures deforms in response to the electrical signal, a corresponding mirror layer remains planar, thereby allowing all of the mirrors thereof to reflect light beams.

31. The image display system according to claim 30, wherein each of the mirror layers is cantilevered from a corresponding spacer member, the bottom of said each of the mirror layers being mounted on top of each of the corresponding spacer members at the first portion thereof.

32. The image display system according to claim 31, wherein each of the supporting members is simultaneously connected to the distal end of a corresponding actuating structure and the top surface of the substrate.

33. The image display system according to claim 32, wherein each of the spacer members is located on top of the distal end of a corresponding actuating structure.

34. The image display system according to claim 33, wherein each of the mirror layers further includes a mirror base layer between said each of the mirror layers and the spacer member.

35. The image display system as cited in claim 1, wherein the driver circuit includes:

a memory means for storing a video signal in the form of a digitized signal, the video signal having a plurality of line video signals, each of the line video signals being scanned in accordance with a scanning pulse, each of the line video signals being divided into N number of n-bit data signals, each of the N number of n-bit data signals being sequentially generated from the memory, wherein n is an integer;

means for deriving from the scanning pulse a clock pulse to drive each of said N number of thin film actuating structures in a same column;

means for deriving from the scanning pulse a data control signal having a first pulse followed by a second pulse, each of the first and the second pulses having an associated duration, wherein the N number of n-bit data signals are available during the duration of the first pulse;

means for generating an enable signal; and a plurality of driving means of a substantially identical construction, each of the driving means being sequentially enabled in accordance with the enable signal to individually drive a predetermined number of actuated mirrors within a same column so that it applies individually to the predetermined number of actuated mirrors.

36. The image display system as cited in claim 35, wherein each of the driving means has:

means for generating a sequential signal through the use of the scanning pulse together with the enable signal being used to permit the corresponding number of n-bit data signals to be received in sequence;

means having a corresponding number of input latches, each of the input latches for temporarily storing one of the corresponding number of n-bit data signals in accordance with the sequential signal;

means having a corresponding number of transfer gates, each of the transfer gates, in synchronism with the transition from the first pulse to the second pulse, simultaneously outputting the n-bit data signal from each of the input latches;

means having a corresponding number of conversion means, each of the conversion means converting the n-bit data signal transferred from a corresponding transfer gate into an analog voltage quantity which is proportional to the value of the n-bit data signal; and means having a corresponding number of amplifying means, each of the amplifying means amplifying the analog voltage quantity to produce the signal voltage to be applied to each of the predetermined number of actuated mirrors.

37. The image display system as cited in claim 36, wherein the conversion means has a digital-to-analog converter.

38. The image display system as cited claim 37, wherein the analog voltage quantity is one of $2^n$ different gradation values over a given operating voltage range applied to the digital-to-analog converter.

39. An image display system capable of displaying an M×N number of pixels, wherein M and N are integers, respectively, comprising:

a light source for emitting a white light;

a total mirror for reflecting the white light from the light source at a predetermined angle;

an array of M×N pixel filters, each of the pixel filters being capable of transmitting only one of primary light beams;

an array of M×N actuated mirrors, each of the M×N actuated mirrors for generating an optical pixel signal by reflecting the white light beams impinging thereon, each of the actuated mirrors capable of changing the optical paths of the primary light beams reflected therefrom;

a projection stopper for partially transmitting each optical pixel signal;

a driver circuit for controlling each actuated mirror based on an input image signal; and a projection screen for displaying the optical pixel signals passing through the projection stopper.

40. The image display system as recited in claim 39, wherein each of the actuated mirrors includes a pedestal, an actuator cantilevered from the pedestal and a mirror formed on top of the actuator, and the mirror in each of the actuated mirrors having a bending portion and an unbending portion, the unbending portion referring to a portion of the mirror on top of a portion of the actuator directly cantilevered on the pedestal, and each of the actuators is made of a piezoelectric or an electrostrictive material which deforms in response to the electric signal applied thereto.

41. The image display system as recited in claim 40, further comprising a field lens, located between the total mirror and the array of M×N actuated mirrors, wherein the field lens is used for collimating the white light reflected from the total mirror onto the array of M×N actuated mirrors and for refocussing each of the primary light beams reflected from each of the actuated mirrors in the array.

42. The image display system as recited in claim 41, wherein each of the primary light beams transmitted through the array of M×N pixel filters impinges onto a corresponding actuated mirror in the array and each of the primary light beams reflected by each of the actuated mirrors impinges onto the field lens through the array of M×N pixel filters to thereby produce a packet of reflected primary light beams.

43. The image display system as recited in claim 42, further comprising a source stopper, provided with a light transmitting portion having a specific configuration and a light stopping portion and being placed in front of the light source, for shaping the white light from the light source into a predetermined configuration.

44. The image display system as recited in claim 43, further comprising a source lens, disposed between the source stopper and the light source, for focussing the white light onto the source stopper.

45. The image display system as recited in claim 44, further comprising a total mirror capable of providing a total reflection of the white light from the source stopper.

46. The image display system as recited in claim 45, further comprising a projection lens for projecting the primary light beams transmitted through the projection stopper onto the projection screen, thereby displaying each of the pixels corresponding thereto.

47. The image display system as recited in claim 46, further comprising a cooler for reducing heat generated in the arrays of M×N actuated mirrors.

48. The image display system as recited in claim 47, wherein the array of M×N pixel filters includes a plurality of sets of R pixel filter, G pixel filter and B pixel filter, and each of the sets is duplicated both in a horizontal and a vertical directions.

49. The image display system as recited in claim 48, wherein each of the pixel filters is capable of transmitting only one of the primary light beams.

50. The image display system as recited in claim 49, wherein each of the sets is of a perfect square.

51. The image display system as recited in claim 50, wherein each of the pixel filters is treated with a dichroic, die coating or pigment coating.

52. The image display system as recited in claim 51, wherein the dichroic coating is comprised of a dielectric material.

53. The image display system as recited in claim 52, wherein the array of M×N pixel filters further includes a black matrix having a plurality of diffusion bands, each of the diffusion bands separating the columns of the pixel filters in the array.

54. The image display system as recited in claim 53, wherein each of the diffusion bands in the black matrix has a same width as the unbending portion in each of the actuated mirrors.

55. The image display system as recited in claim 54, wherein each of the diffusion bands in the black matrix is aligned along the column direction of the array of M×N actuated mirrors.

56. The image display system as recited in claim 55, wherein each of the diffusion bands in the black matrix is made of a light reflective material.

57. The image display system as recited in claim 56, wherein the light reflective material is chromium.

58. The image display system as recited in claim 57, wherein each of the arrays of M×N actuated mirrors includes:
   an active matrix including a substrate and an array of M×N connecting terminals;
   an array of M×N actuated mirrors, each of the actuated mirrors being provided with a top and a bottom surfaces, a proximal and a distal ends, each of the actuated mirrors having at least a thin film layer of a motion-inducing material having a top and a bottom surfaces, and a first and a second electrodes of a specific thickness, the first electrode being placed on the top surface of the motion-inducing thin film layer and the second electrode, on the bottom surface thereof, wherein an electrical signal applied across the motion-inducing thin film layer between the first and the second electrodes causes a deformation of the motion-inducing layer, and the actuated mirrors;
   an array of M×N supporting members, each of the supporting members being provided with a top and a bottom surfaces, wherein each of the supporting members is used for holding each of the actuated mirrors in place and also electrically connecting a corresponding actuated mirror with the active matrix, wherein the corresponding actuated mirror is cantilevered from said each of the supporting members, the bottom surface of the corresponding actuated mirror being mounted on the top surface of each of the supporting members at the proximal end; and
   an array of M×N mirrors for reflecting light beams, wherein each of the mirrors is placed on top of the corresponding actuated mirror such that said each of the mirrors deforms in response to the deformation of the corresponding actuated mirror.

59. The image display system as recited in claim 58, wherein the bottom surface of each of the supporting members is placed on top of the active matrix.

60. The image display system as recited claim 58, wherein the motion-inducing thin film layer is made of a piezoelectric ceramic or a piezoelectric polymer.

61. The image display system as recited in claim 58, wherein the motion-inducing thin film layer is poled.

62. The image display system as recited in claim 58, wherein the motion-inducing thin film layer is made of an electrostrictive material.

63. The image display system as recited in claim 58, wherein the motion-inducing thin film layer is made of a magnetostrictive material.

64. The image display system as recited in claim 58, wherein each of the supporting members is provided with a conduit for electrically connecting the second electrode in a corresponding actuated mirror with the corresponding connecting terminal on the active matrix.

65. The image display system as recited in claim 58, wherein each of the M×N mirrors is made of a light reflecting material.

66. The image display system as recited in claim 58, wherein the first and the second electrodes cover completely the top and the bottom surfaces of the motion-inducing thin film layer, respectively.

67. The image display system as recited in claim 58, wherein either the first or the second electrode covers partially the top or the bottom surface of the motion-inducing thin film layer.

68. The image display system as recited in claim 58, wherein the first and the second electrodes are made of an electrically conducting material.

69. The image display system as recited in claim 68, wherein the first electrode is made of a light reflecting material, to thereby allow the first electrode to function also as the mirror in a corresponding actuated mirror.

70. The image display system as recited in claim 69, wherein the first electrode has a same thickness as the second electrode in each of the actuated mirrors.

71. The image display system as recited in claim 70, further including M×N elastic layers, each of the elastic layers being placed on the bottom surface of the actuated mirrors.

72. The image display system as recited in claim 71, wherein the first electrode has a different thickness from that of the second electrode in each of the actuated mirrors.

73. The image display system as recited in claim 58, further comprising M×N elastic layers, each of the elastic layers being placed on the top surface of a corresponding actuated mirror.

74. The image display system as recited in claim 73, wherein each of the elastic layers is disposed between the mirror and the first electrode in a corresponding actuated mirror.

75. The image display system as recited in claim 58, further comprising M×N elastic layers, each of the elastic layers being placed on the bottom surface of a corresponding actuated mirror.

76. The image display system according to claim 47, wherein each of the arrays of M×N actuated mirrors includes:
   a substrate including an array of M×N connecting terminals formed on top thereof;
   an array of M×N actuated mirrors, each of the actuated mirrors being provided with a proximal and a distal ends, each of the actuated mirrors having at least a thin film layer of a motion-inducing material and a first and a second electrodes with the first electrode being placed on top of the motion inducing layer and the second electrode on bottom of the motion-inducing layer, wherein an electrical signal applied across the motion-inducing layer between the first and the second electrodes causes a deformation of the motion-inducing layer, and the actuated mirror;
   an array of M×N supporting members, each of the supporting members being located between a corresponding actuated mirror and the substrate, and being used for cantilevering the corresponding actuated mirror;
   an array of M×N spacer members, each of the spacer members being disposed on top of a corresponding actuated mirror at the distal end thereof; and an array of M×N mirror layers, each of the mirror layers including a first and a second portions corresponding to the distal and the proximal ends of a corresponding actuated mirror, the first portion of each of the mirror layers being secured on top of a corresponding spacer member such that when each of the actuated mirrors deforms in response to the electrical signal, the corresponding mirror layer remains planar, thereby allowing all of the mirror thereof to reflect light beams.

77. The image display system according to claim 76, wherein each of the mirror layers is cantilevered from a corresponding spacer member, the bottom of each of the mirror layers being mounted on top of a corresponding spacer member.

78. The image display system according to claim 77, wherein each of the supporting layers is simultaneously connected to the distal end of a corresponding actuated mirror and the top surface of the substrate.

79. The image display system according to claim 78, wherein each of the spacer members is located on top of the distal end of a corresponding actuated mirror.

80. The image display system according to claim 79, wherein each of the mirror layers further includes a mirror base layer between said each of the mirror layers and a corresponding spacer member.

81. The image display system as cited in claim 39, wherein the driver circuit includes:

a memory means for storing a video signal in the form of a digitized signal, the video signal having a plurality of line video signals, each of the line video signals being scanned in accordance with a scanning pulse, each of the line video signals being divided into N number of n-bit data signals, each of the N number of n-bit data signals being sequentially generated from the memory, wherein n is an integer;

means for deriving from the scanning pulse a clock pulse to drive each of N number of thin film actuated mirrors in a same column;

means for deriving from the scanning pulse a data control signal having a first pulse followed by a second pulse, each of the first and the second pulses having an associated duration, wherein the N number of n-bit data signals are available during the duration of the first pulse;

means for generating an enable signal; and a plurality of driving means of a substantially identical construction, each of the driving means being sequentially enabled in accordance with the enable signal to individually drive a predetermined number of actuated mirrors within the same column so that it applies individually to the predetermined number of actuated mirrors.

82. The image display system as cited in claim 81, wherein each of the driving means has:

means for generating a sequential signal through the use of the scanning pulse together with the enable signal being used to permit the corresponding number of n-bit data signals to be received in sequence;

means having a corresponding number of input latches, each of the input latches for temporarily storing one of the corresponding number of n-bit data signals in accordance with the sequential signal;

means having a corresponding number of transfer gates, each of the transfer gates, in synchronism with the transition from the first pulse to the second pulse, simultaneously outputting the n-bit data signal from a corresponding input latch;

means having a corresponding number of conversion means, each of the conversion means converting the n-bit data signal transferred from a corresponding transfer gate into an analog voltage quantity which is proportional to the value of the n-bit data signal; and means having a corresponding number of amplifying means, each of the amplifying means amplifying the analog voltage quantity to produce the signal voltage to be applied to each of the predetermined number of actuated mirrors.

83. The image display system as cited in claim 82, wherein the conversion means has a digital-to-analog converter.

84. The image display system as cited claim 83, wherein the analog voltage quantity is one of $2^n$ different gradation values over a given operating voltage range applied to the digital-to-analog converter.

* * * * *